2 Sheets—Sheet 1.

A. F. HAMMOND.
Corn-Planters.

No. 196,146. Patented Oct. 16, 1877.

WITNESSES:
E. Wolff
J. H. Scarborough

INVENTOR:
A. F. Hammond
BY
ATTORNEYS.

2 Sheets—Sheet 2.

A. F. HAMMOND.
Corn-Planters.

No. 196,146. Patented Oct. 16, 1877.

WITNESSES:

INVENTOR:
A. F. Hammond
BY
ATTORNEYS.

UNITED STATES PATENT OFFICE.

ALFRED F. HAMMOND, OF BERLIN, (LORAMIE'S P. O.,) OHIO.

IMPROVEMENT IN CORN-PLANTERS.

Specification forming part of Letters Patent No. 196,146, dated October 16, 1877; application filed May 12, 1877.

*To all whom it may concern:*

Figure 1:
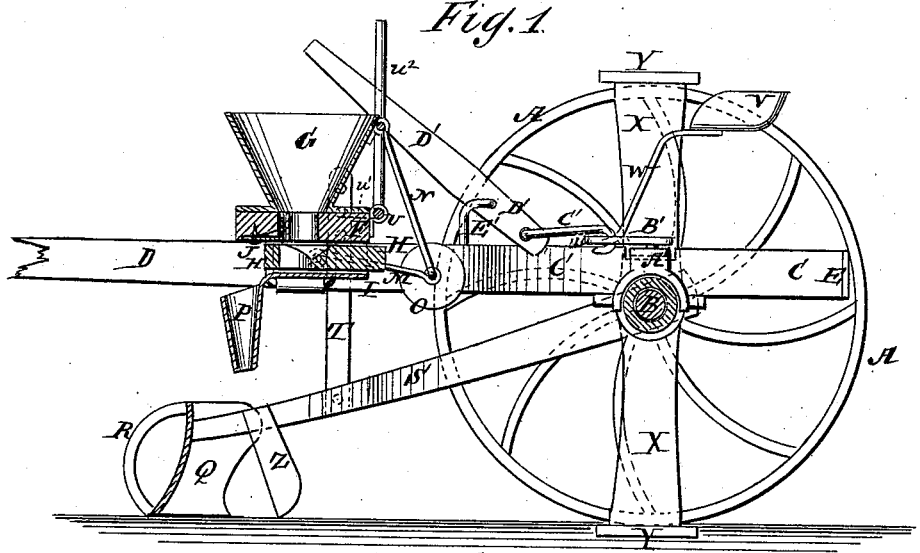
Figure 2:
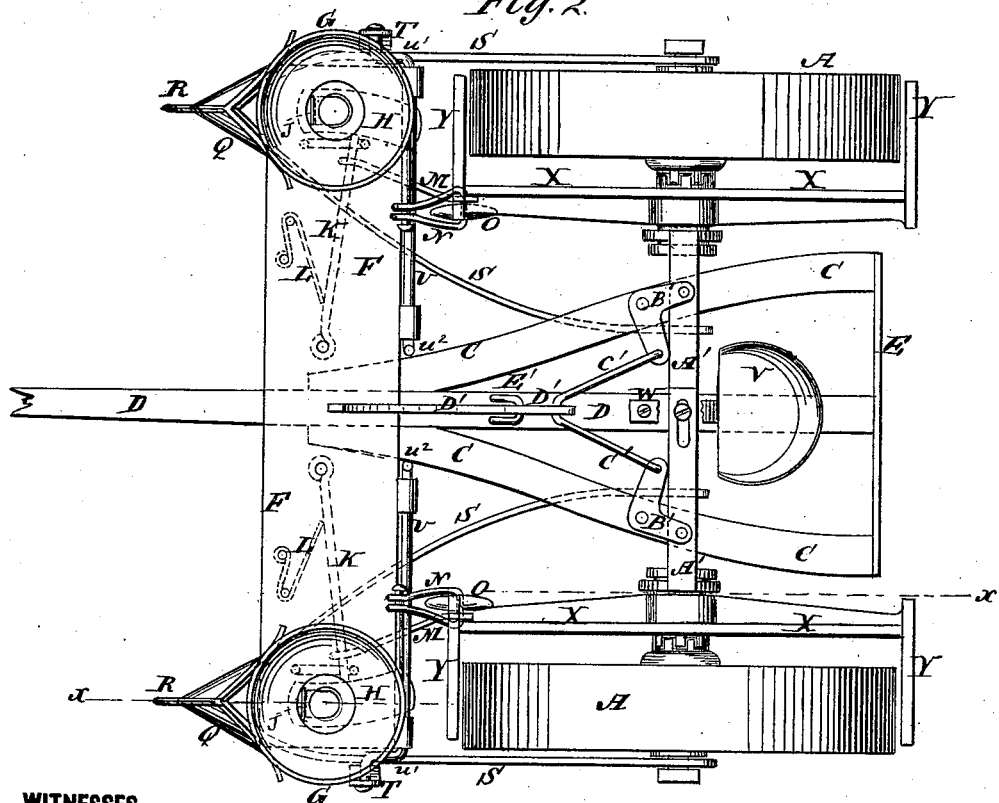
Figure 3:
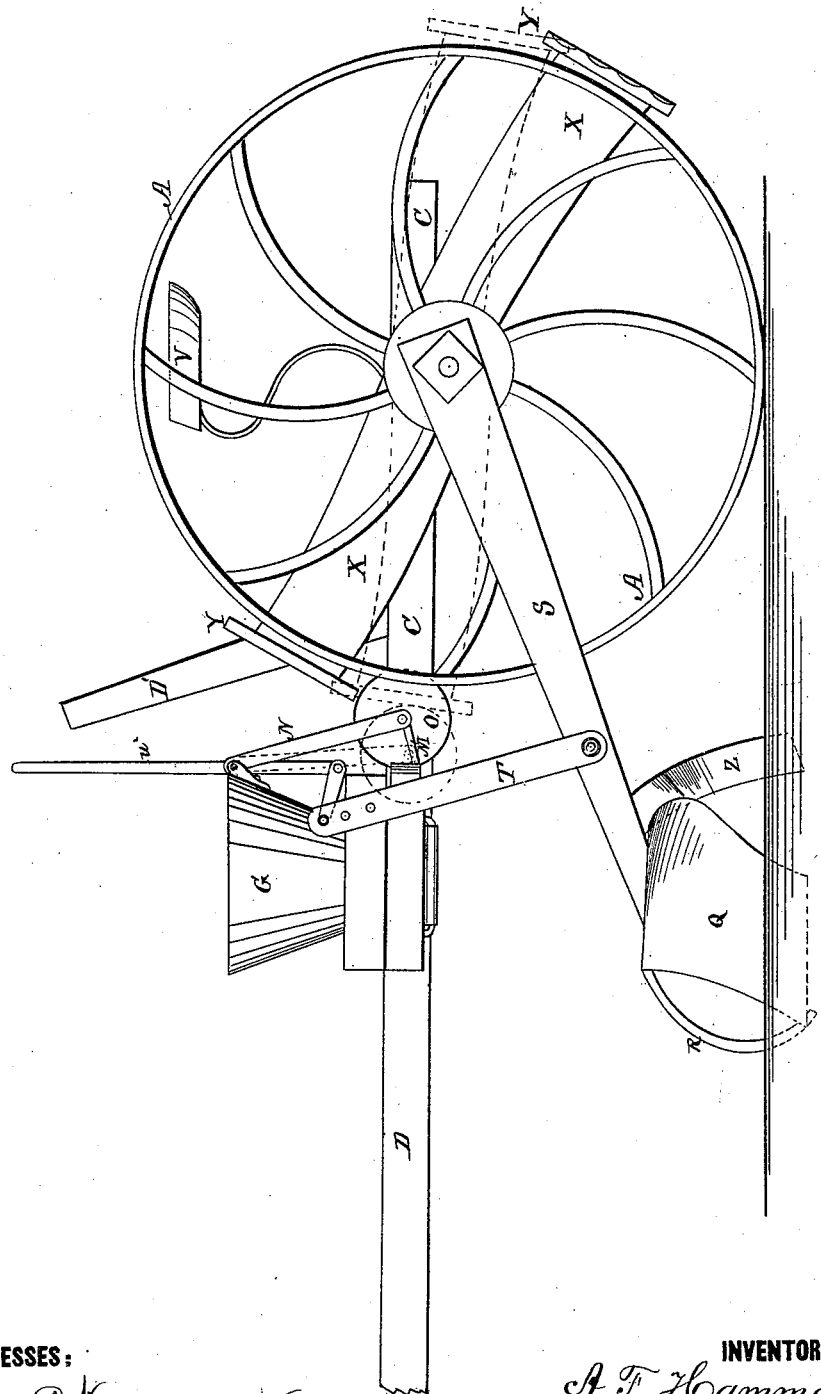

Be it known that I, ALFRED F. HAMMOND, of Berlin, (Loramie's P. O.,) in the county of Shelby and State of Ohio, have invented a new and useful Improvement in Corn-Planters, of which the following is a specification:

Figure 1 is a vertical section of my improved planter, taken through the line $x$ $x$, Fig. 2. Fig. 2 is a top view of the same. Fig. 3 is a side elevation of the machine.

Similar letters of reference indicate corresponding parts.

My invention is an improvement in combined planters and markers. The feature of novelty is a certain combination and arrangement of parts, whereby the same devices that press down and flatten the loose earth above the seed, and thereby mark the place where it is deposited, also act upon buffing and friction wheels, that are pivoted to rods by which the seed-slides are vibrated, said rods being connected with the seed-slide levers, arranged beneath the bar upon which the seed-hoppers are supported. To enable this operation to be effected, the marking devices, transporting-wheels, and seed-hoppers require to be arranged in line.

A are the wheels, which revolve loosely upon the journals of the axle B. The axle B revolves in bearings attached to the hounds C, to which the tongue D is attached.

The hounds C and tongue D project in the rear of the axle B, and to their rear ends is attached a bar, E. To the tongue D and the forward ends of the hounds C is attached the center of a cross-bar, F, to the ends of which are attached the seed-hoppers G. From the bottom of the hoppers G a hole passes down through the bar F, so that the seed may rest upon the dropping-slide H, which works in a keeper, I, attached to the under side of the bar F, and which is kept from carrying out any more seed than enough to fill its dropping-hole by the spring cut-off J, embedded and closely fitted in a recess in the lower side of the bar F, and the forward end of which is bent upward and works in a slot in the said bar F.

To the inner side of the dropping-slide H is attached the outer end of the lever K, the inner end of which is pivoted to the middle part of lower side of the bar F, and which is held back by a spring, L, attached to the said bar F, and pressing against the forward side of the said lever.

To the inner part of the lever K is attached the forward end of a bar, M, the rear end of which is attached to the lower part of the U or slotted bar N. To the lower end of the bar N is pivoted a wheel, O, for the marker-foot to strike against to push the dropping-slide H forward to drop the seed. The upper end of the bar N is pivoted to a support attached to the hopper G or bar F.

As the seed falls from the dropping-slide H it falls into the conductor-spout P, which passes down into the cavity in the rear part of the plow Q, and conducts the seed into the furrow before the said furrow has been partially filled by the falling in of the soil.

The plows Q are made with two mold-boards, and have a curved colter, R, attached to the upper and lower parts of their forward angles.

To the upper parts of the inner sides of the mold-boards of each plow Q are attached the forward ends of two bars, S, the rear ends of the outer ones of which are connected with and ride upon the ends of the axle B.

The rear ends of the inner bars S are connected with and ride upon the middle part of the axle B. The bars S thus brace the wings or sides of the plows at the same time that they constitute the beams of the same, and also connect them to the frame of the machine.

To the forward part of the outer bars S is pivoted the lower end of the connecting-bar T, the upper end of which is pivoted to the short cranks $u^1$, formed upon the outer ends of a rod or rods, U, that works in bearings attached to the rear edge of the bar F.

Upon the inner ends of the rods U are formed arms $u^2$, which project into such a position that the driver from his seat V can readily reach and operate them to raise the plows from the ground, when desired.

The seat V is attached to the upper end of the standard W, the lower end of which is attached to the tongue D a little in front of the axle B.

X are two bars, upon the centers of which are formed hubs, which fit upon the axle B at the inner sides of the wheels A, and are connected with said axle by a tongue and groove, so that the said axle and bars must revolve together.

Upon the outer ends of the hubs of the bars X, and upon the inner ends of the hubs of the wheels A, are formed clutch-teeth to engage with each other, so that the wheels A may carry the bars X with them in their revolution.

Upon the outer ends of the bars X are formed feet Y, which project across the rims of the wheels A, so as to mark the hills.

The feet Y extend entirely or nearly across the peripheries of the wheels, so as to act as dirt-scrapers for the same. With this construction, as each of the feet Y passes down in front of the wheel A it strikes the wheel O, and operates the slide H to drop the seed, which seed is covered by the coverers Z, attached to the forward parts of the bars S, and the soil is pressed down upon the seed, and the hill is marked by the foot Y.

Upon the inner end of the hubs of the bars X is formed a ring-groove, to receive the fork formed upon or attached to the outer ends of the bars A', which extend along the upper side of the axle B, and are slotted longitudinally to receive the bolts by which they are kept in place upon the said axle.

To each of the bars A' is pivoted the end of a bent lever, B', which is pivoted at its angle to the hounds C. To the inner ends of the bent levers B' are pivoted the rear ends of the connecting-rods C', the forward ends of which are pivoted to the lower end of the lever D'. The lever D' is pivoted to a short standard, E', attached to the tongue D, so that by operating the lever D' the bars X may be thrown into and out of gear with the wheels A, as may be desired.

I disclaim a planter and marker in which the seed-slides are operated by markers that revolve with the axle, and may be adjusted thereon to lock them with the wheels.

Having thus described my invention, I claim as new and desire to secure by Letters Patent—

In a combined planter and marker, the combination of the transporting-wheels A A and hoppers G, the revolving bars X, carrying the broad flat feet Y, the friction-wheels O, the pivoted suspending-rods N, bars M, the pivoted levers K, and dropping-slides arranged beneath the apertured bar F, said feet projecting across the periphery of the wheels, which are in alignment with the hoppers and friction-wheels, all as shown and described, to operate as and for the purpose specified.

ALFRED F. HAMMOND.

Witnesses:
D. H. MENKE,
HENRY MENKE.